Patented Jan. 2, 1951

2,536,586

UNITED STATES PATENT OFFICE 2,536,586

METHOD OF DEPOSITING FLUORESCENT MATERIALS BY SEDIMENTATION

Basil Edmund Waye and Arthur George Mitchell, London, England, assignors to A. C. Cossor Limited, London, England, a British company No Drawing. Application November 22, 1944, Serial No. 564,721. In Great Britain January 12, 1944

4 Claims. (Cl. 117—33.5)

This invention relates to the formation, by a sedimentation process, of adherent films of powders which are insoluble, or only slightly soluble, in water. It is particularly applicable to the deposition of fluorescent screens for X-ray or cathode-ray apparatus. It may, for example, be applied to the deposition of fluorescent powders such as the sulphides, silicates, phosphates, oxides or tungstates of zinc, cadmium, calcium, beryllium or magnesium.

In carrying the invention into effect, the film is deposited by sedimentation from a suspension of the powder in a slightly alkaline solution oversaturated with an inorganic substance which has very low solubility in water and which forms a gelatinous precipitate.

The said inorganic substance is preferably a hydroxide, e. g. copper hydroxide. The oversaturated solution may be formed by mixing a slightly alkaline solution with a dilute solution of a soluble salt from which the said inorganic substance will be formed, e. g. of copper sulphate. The solutions should be so dilute that no visible precipitate is formed, but of such concentration that the mixed solution will be over-saturated; this is to say, that the said inorganic substance is in a supersaturated or colloidal solution. The concentration of the said inorganic substance may be of the order of four parts per million.

The powder to be deposited is introduced into the solution in the form of an aqueous suspension. It is dispersed by shaking the mixture. The conductivities of the solutions are so selected that the particles of powder will remain dispersed.

The mixture is allowed to stand for a period, usually of some hours. A film is formed on the support by settling of the powder from the mixture. When the liquid has been removed, for example by pouring off, the remaining film will by the foregoing process be rendered consistently adherent, and may be made permanent by drying by a known method.

An example of the formation of a fluorescent screen for a cathode ray tube by the method according to the invention will now be described.

Two solutions are mixed to form the bulk liquid, which is placed in the tube to cover the surface on which the screen is to be deposited. These solutions may be mixed before pouring into the tube or they may be poured in successively in either order.

One of these solutions is a very dilute solution of copper sulphate in distilled water and contains about two parts of copper per million. The distilled water for making this solution must not have a comparable content of copper or of any other element which will form an insoluble compound when mixed with alkali. It may have a conductivity not greater than about $18 \times 10^{-6}$ mhos per centimetre cube, at 18° C., but preferably this should be about $6 \times 10^{-6}$.

Of this very dilute solution of copper sulphate, 1,000 ccs. are poured into the cathode ray tube.

The other solution is a very dilute solution of caustic soda (alkali metal hydroxide) in tap water, the concentration of caustic soda being, for example, about 0.0025 gm./litre. The conductivity of the tap water may be of the order of $520 \times 10^{-6}$.

Of this solution, 400 ccs. are poured into the cathode ray tube.

The conductivity of the bulk liquid, being the mixture of these two solutions in the cathode ray tube, may be about $180 \times 10^{-6}$, or other value between the limits $260 \times 10^{-6}$ and $140 \times 10^{-6}$ mhos per cubic centimeter.

The luminescent powder may, for example, be calcium phosphate or zinc sulphide. An aqueous suspension is prepared containing particles of sizes ranging from $\frac{1}{2}$ micron to 3 microns. The required quantity of this suspension to provide the desired thickness of screen, say 0.5 mgm./cm.$^2$, is poured into the bulk liquid in the cathode ray tube. The mixture is next agitated and then left for 4 to 8 hours for the powder to settle. It is believed that the formation of a coating of copper hydroxide around the particles of luminescent powder proceeds slowly at the same time as the settling.

The liquid may now be poured off and the screen, when dried, is ready for use.

The function of the tap water, which is essentially a very dilute solution of alkaline carbonate, is to give an appropriate conductivity to the bulk liquid to keep the particles of luminescent powder dispersed. A special solution may be prepared for this purpose and substituted for the tap water.

In the place of copper hydroxide, other insoluble inorganic hydroxides may be used, such as those of zinc, aluminium or other metals. These hydroxides form gelatinous precipitates. Alternatively, an insoluble inorganic basic carbonate may be used. In all of these cases some soluble compound of the desired element is substituted for the copper sulphate in the preparation of the bulk liquid.

The process has been successfully applied with zinc sulphide powders having particle size as large as 30 microns; but with such large particles it is important that the aqueous suspension of the powder should be added after the solutions forming the over-saturated solution have already been mixed. When powders having particle size as small as about 3 microns are employed, it is usually found to be immaterial in what order the two solutions and the suspension are mixed, and they may be mixed before pouring into the tube.

We claim:

1. In the formation of adherent films of fluorescent powders on the walls of electron tubes, the process which comprises mixing an extremely dilute aqueous solution of a water-soluble salt of a metal which forms an insoluble gelatinous metal hydroxide and selected from a group consisting of copper, aluminum and zinc, with another extremely dilute solution containing sufficient alkali metal hydroxide to produce a mixed bulk solution which is supersaturated with the hydroxide of said metal but in which the said hydroxide forms a colloidal solution without the formation of a visible precipitate, the two solutions having concentrations such that their mixture has an electrolytic conductivity of only from about $260 \times 10^{-6}$ to $140 \times 10^{-6}$ mhos per cubic centimeter; dispersing in the said bulk solution a fluorescent powder, permitting the fluorescent powder to settle out of the bulk solution by gravity on the wall of an electron tube containing said bulk solution then removing the supernatant bulk solution and drying the resulting adherent film containing the fluorescent powder.

2. The process of claim 1 wherein the metal salt solution contains a salt of copper in a concentration within the range of from about 2 to 4 parts of copper per million.

3. The process of claim 1 wherein the alkaline solution is formed by dissolving an alkali metal hydroxide in tap water.

4. In the formation of adherent films of fluorescent powders on the walls of electron tubes, the process which comprises mixing an aqueous solution of copper sulfate, containing only from about 2 to 4 parts per million of copper, with an aqueous solution containing of the order of about 0.0025 gram of caustic soda per liter in proportions producing a super-saturated colloidal solution of copper hydroxide with the formation of no visible precipitate, the mixed bulk solution having an electrolytic conductivity within the range of from about $260 \times 10^{-6}$ to $140 \times 10^{-6}$ mhos per cubic centimeter, dispersing a finely-divided fluorescent powder in said bulk solution, permitting the fluorescent powder to settle out of the bulk solution by gravity on a wall of an electron tube containing said bulk solution, removing the supernatant bulk solution from the tube and drying the resulting adherent film containing the fluorescent powder.

BASIL EDMUND WAYE.
ARTHUR GEORGE MITCHELL.

REFERENCES CITED

The following references are of record in the file of this patent:

UNITED STATES PATENTS

| Number | Name | Date |
|---|---|---|
| 825,637 | Brown | July 10, 1906 |
| 2,062,858 | Batchelor | Dec. 1, 1936 |
| 2,376,437 | Leverenz | May 22, 1945 |
| 2,412,654 | Sadowsky | Dec. 17, 1946 |